United States Patent
Sturm et al.

(10) Patent No.: US 12,306,335 B2
(45) Date of Patent: May 20, 2025

(54) METHOD FOR DETERMINING AT LEAST ONE PIECE OF OBJECT INFORMATION ABOUT AT LEAST ONE OBJECT SENSED BY MEANS OF A RADAR SYSTEM AND RADAR SYSTEM

(71) Applicant: Valeo Schalter und Sensoren GmbH, Bietigheim-Bissingen (DE)

(72) Inventors: Christian Sturm, Bietigheim-Bissingen (DE); Hamid Afrasiabi Vayghan, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 413 days.

(21) Appl. No.: 17/783,872

(22) PCT Filed: Dec. 7, 2020

(86) PCT No.: PCT/EP2020/084807
§ 371 (c)(1),
(2) Date: Jun. 9, 2022

(87) PCT Pub. No.: WO2021/115986
PCT Pub. Date: Jun. 17, 2021

(65) Prior Publication Data
US 2023/0051791 A1 Feb. 16, 2023

(30) Foreign Application Priority Data
Dec. 11, 2019 (DE) .................. 10 2019 133 977.4

(51) Int. Cl.
*G01S 7/35* (2006.01)
*G01S 13/931* (2020.01)

(52) U.S. Cl.
CPC ............ *G01S 7/356* (2021.05); *G01S 13/931* (2013.01)

(58) Field of Classification Search
CPC .............................. G01S 7/356; G01S 13/931
See application file for complete search history.

(56) References Cited

U.S. PATENT DOCUMENTS

2019/0049577 A1 2/2019 Iida et al.
2020/0355789 A1 11/2020 Kitamura
2021/0111479 A1* 4/2021 Spalink ............... G01S 13/89

FOREIGN PATENT DOCUMENTS

CN 105264400 A 1/2016
CN 110161504 A 8/2019
(Continued)

OTHER PUBLICATIONS

International Search Report and Written Opinion in corresponding International Application No. PCT/EP2020/084807, dated Mar. 4, 2021 (14 pages).
(Continued)

*Primary Examiner* — Peter M Bythrow
*Assistant Examiner* — Nazra Nur Waheed
(74) *Attorney, Agent, or Firm* — Osha Bergman Watanabe & Burton LLP (57) ABSTRACT

The invention relates to a method for determining at least one piece of object information about at least one object sensed by means of a radar system and to a radar system. According to the method, transmission signals in the form of chirps are transmitted by at least three transmitters in each case in chirp sequences in a monitoring region of the radar system. Echoes of the transmission signals reflected at the at least one object are received as reception signals by means of at least one receiver and, if necessary, are brought into a
(Continued)

form that can be used by an electronic control and/or evaluation device. The reception signals are subjected to at least one two-dimensional discrete Fourier transformation. At least one target signal ($ZS1\_a$, $ZS2\_a$, $ZS3\_a$, $ZS4\_a$, $ZS1\_b$, $ZS2\_b$, $ZS3\_b$, $ZS4\_b$) is determined from the outcome of the at least one two-dimensional discrete Fourier transformation. At least one piece of object information is determined from the at least one target signal ($ZS1\_a$, $ZS2\_a$, $ZS3\_a$, $ZS4\_a$, $ZS1\_b$, $ZS2\_b$, $ZS3\_b$, $ZS4\_b$). On the transmitter side, at least one first transmission signal and at least two other transmission signals are generated from a frequency-modulated continuous wave signal and simultaneously transmitted into the monitoring region of the radar system by means of a separate transmitter in each case. The at least two other transmission signals are each encoded by means of a phase modulation in relation to the at least one first transmission signal. The respective phase positions of the at least two other transmission signals are each incremented or decremented from one chirp to the next by a constant phase shift amount. Different phase shift amounts are used for the at least two other transmission signals. The respective phase shift amounts for the at least two other transmission signals are specified such that for at least three of the transmission signals, including the at least one first transmission signal, the differences in amount between the phase shift amounts of two of the at least three transmission signals are different.

12 Claims, 3 Drawing Sheets

(56) References Cited

FOREIGN PATENT DOCUMENTS

| | | | |
|---|---|---|---|
| DE | 102018121987 A1 | 3/2020 | |
| JP | 2018-009667 A | 1/2018 | |
| JP | 2019-128235 A | 8/2019 | |
| WO | 2017179515 A1 | 10/2017 | |
| WO | WO-2018137836 A1 * | 8/2018 | ........... G01S 13/343 |
| WO | 2019146644 A1 | 8/2019 | |

OTHER PUBLICATIONS

German Search Report in corresponding German Application No. 10 2019 133 977.4, dated Jul. 16, 2020 (10 pages).
Office Action issued in counterpart Chinese Patent Application No. 202080092677.6 mailed Mar. 20, 2024 (17 pages).
Office Action issued in counterpart Chinese Patent Application No. 202080092677.6 mailed Sep. 28, 2024 (18 pages).

* cited by examiner

METHOD FOR DETERMINING AT LEAST ONE PIECE OF OBJECT INFORMATION ABOUT AT LEAST ONE OBJECT SENSED BY MEANS OF A RADAR SYSTEM AND RADAR SYSTEM

TECHNICAL FIELD

The invention relates to a method for determining at least one piece of object information of at least one object sensed by means of a radar system, in which
with at least three transmitters, transmission signals in the form of chirps are transmitted in chirp sequences into a monitoring region of the radar system,
echoes, which are reflected at the at least one object, of the transmission signals are received as received signals with at least one receiver, and if necessary are converted into a form which can be used by an electronic control and/or evaluation device,
the received signals are subjected to at least one two-dimensional discrete Fourier transformation,
at least one target signal is determined from the result of the at least one two-dimensional discrete Fourier transformation,
at least one piece of object information is determined from the at least one target signal,
wherein at the transmitter end at least one first transmission signal and at least two other transmission signals are generated from a frequency-modulated continuous wave signal and each is transmitted simultaneously into the monitoring region of the radar system with a separate transmitter,
wherein the at least two other transmission signals are each encoded by a phase modulation with respect to the at least one first transmission signal,
wherein the respective phase positions of the at least two other transmission signals are incremented or decremented by a constant phase shift amount from one chirp to the next,
wherein different phase shift amounts are used for the at least two other transmission signals.

In addition, the invention relates to a radar system for determining at least one piece of object information about at least one object,
having at least one transmitter for transmitting chirps into a monitoring region in chirp sequences,
having at least one receiver for receiving echoes, which are reflected at the at least one object, of the transmission signals as received signals and
having at least one control and/or evaluation device for controlling the at least one transmitter and the at least one receiver and for evaluating the received signals.

PRIOR ART

Document WO 2018/137836 discloses a method for determining at least one piece of object information about at least one object which is sensed with a radar system, in particular of a vehicle. In the method, transmission signals are transmitted into a monitoring region of the radar system using at least one transmitter. Echoes, which are reflected at the at least one object, of the transmission signals are received as received signals with at least one receiver, and if necessary are converted into a form which can be used by an electronic control and/or evaluation device. The received signals are subjected to at least one two-dimensional discrete Fourier transformation. At least one target signal is determined from the result of the at least one two-dimensional discrete Fourier transformation. At least one piece of object information is determined from the at least one target signal. At the transmitter end, at least one first transmission signal and at least one second transmission signal are generated from a frequency-modulated continuous wave signal, wherein the at least one second transmission signal is encoded by means of a phase modulation with respect to the at least one first transmission signal, wherein the phase position of the at least one second transmission signal is incremented or decremented by a constant amount from one frequency ramp to the next. In the phase modulation of multiple second transmission signals, different phase increments can be used for the respective second transmission signals. The at least one first transmission signal is emitted with at least one first transmitter and the at least one second transmission signal is emitted with at least one second transmitter simultaneously into the monitoring region of the radar system. Using the control and evaluation device, the transmitters can be controlled in such a way that with the first transmitter the first transmission signal, with the second transmitter the second transmission signal, and with a third transmitter a third transmission signal are simultaneously transmitted into the monitoring region.

The invention is based on the object of configuring a method and a radar system of the type mentioned above in which any ambiguities with respect to object information, in particular distance, speed and/or direction of the at least one object relative to the radar system, can be resolved more simply and/or more reliably.

DISCLOSURE OF THE INVENTION

This object is achieved according to the invention by the fact that the respective phase shift amounts for the at least two other transmission signals are specified in such a way that for at least three of the transmission signals, including the at least one first transmission signal, the absolute differences between the phase shift amounts of any two of the at least three transmission signals are different.

According to the invention, at least one target signal is assigned to a corresponding transmission signal and thus validated. By the phase modulation of the transmission signals according to the invention, the corresponding target signals resulting from the different transmitters, in particular viewed in the Doppler dimension, are shifted relative to each other and thus form a unique overall pattern. Depending on the number of available modulation stages of the phase modulation, it is therefore possible to use significantly more than three transmitters simultaneously. The transmission signals in this case are completely orthogonal at the output of the two-dimensional Fourier transform, in particular FFT. The method can be extended to a corresponding number of simultaneously active transmitters using higher-order modulation methods.

With the invention, a MIMO radar with fast chirp signals can be realized. The MIMO radar can be operated using a Doppler multiplexing method. By means of the different constant incrementing of the phase positions of the transmission signals at the individual transmitters, signals can be generated that are shifted along the Doppler dimension after the two-dimensional discrete Fourier transformation carried out at the receiver end and are thus orthogonal.

As is known, a signal the frequency of which changes over time is referred to as a chirp. The frequency response of a chirp can be represented as a frequency ramp.

According to the invention, the respective phase shift amounts for the at least two other transmission signals are specified in such a way that for at least three of the transmission signals, including the at least one first transmission signal, the absolute differences between the phase shift amounts of any two of the at least three transmission signals are different. This reduces the occurrence of interference effects between target signals that can occur from different targets at different speeds at the same distance, in particular in a distance Doppler cell with the same distance value. Interference between two target signals of targets with different speeds in the same range cell can potentially occur without the invention if their speeds differ exactly by an integer multiple of a selected distance between the transmitters in the Doppler dimension. By means of the invention, interference between target signals from multiple targets with different speeds can also be avoided for multiple targets using a plurality of transmitters.

According to the invention, at the receiver end after the Fourier transformation, different Doppler offsets are realized in a distance Doppler matrix for the different transmitters as a result of the different phase shift amounts at the transmitter end. The Doppler offset for a transmitter is given by an individual fraction of the uniqueness range in the Doppler dimension. The uniqueness range can be characterized in the distance Doppler matrix by a specified number of distance Doppler cells in the Doppler dimension. Accordingly, the uniqueness range at the transmitter end can correspond to a phase shift of 360°. The phase shift amounts of the different transmitters can each be specified as an individual fraction of 360°.

The at least one second transmission signal can be encoded by means of phase modulation with respect to the at least one first transmission signal in such a way that an at least temporary signal orthogonality is brought about between the transmission signals.

The at least three transmitters are active at the same time. In this way, the determination of the object information can be speeded up.

Due to the fact that the phase modulation of the at least two other transmission signals uses different phase shift amounts, the at least two other transmission signals can be realized orthogonally to each other and to the at least one first transmission signal.

The reflected echoes are received at the transmission end as received signals and, if necessary, are converted into a form which can be used by an electronic control and/or evaluation device. If the transmission signals and the resulting echoes have a type of signal which cannot be processed directly with the corresponding electronic control and/or evaluation device, the received signals are converted into an electronically usable form. Otherwise, there is no need for corresponding adaptation, in particular conversion, of the received signals. In this way, the received signals can be processed by means of the electronic control and/or evaluation device either directly or, if appropriate, after corresponding adaptation.

The method can advantageously be implemented with at least one means using software and/or hardware solutions, in particular by means of a control and/or evaluation device.

The radar system can advantageously use fast frequency modulation. A plurality of chirps are emitted consecutively as sequences.

The phase modulation can be advantageous performed at the clock rate of the chirps (chirp clock rate). In this way, a required frequency of the code sequence and thus a required signal bandwidth can be kept correspondingly low.

From the result of the at least one two-dimensional discrete Fourier transformation, a plurality of target signals can be determined, the number of which per physically present target corresponds at most to the total number of the first and two other transmission signals. A physically present target can be part of a detected object. Target signals can also be referred to as radar targets.

The invention can be used in a radar system of a vehicle, in particular a motor vehicle. The invention can advantageously be used in the case of a land-based vehicle, in particular an automobile, a truck, a bus, a motorcycle or the like, an aircraft and/or a watercraft. The invention can also be used in the case of vehicles that can be operated autonomously or at least partially autonomously. However, the invention is not limited to vehicles. It can also be used in radar systems in stationary operation.

The radar system can advantageously be connected to at least one electronic control device of the vehicle, in particular a driver assistance system and/or a chassis control system and/or a driver information device and/or a parking assistance system and/or a gesture recognition or the like or can be part of such a device or system. The vehicle can be operated autonomously or partially autonomously in this way.

The radar sensor can be used to capture standing or moving objects, in particular vehicles, persons, animals, plants, obstacles, road unevennesses, in particular potholes or rocks, roadway boundaries, traffic signs, free spaces, in particular free parking spaces, or precipitation or the like.

In one advantageous configuration of the method, the phase position of the at least one first transmission signal is held constant from one chirp to the next and a corresponding phase shift amount equal to zero is used. In this way, object information can be derived directly from target signals, which can be assigned to the at least one first transmission signal.

In a further advantageous configuration of the method the at least two other transmission signals are encoded in such a way that of all transmission signals including the at least one first transmission signal, the absolute differences between the phase shift amounts of any two of the at least three transmission signals are different. In this way, the number of interfering target signals can be further reduced.

In a further advantageous configuration of the method the phase shift amounts of the transmission signals can be specified in such a way that there are no two phase shift amounts among the phase shift amounts for which the absolute difference equals the absolute difference of at least one of the two phase shift amounts for a phase shift amount of another transmission signal. In this way, the number of interfering target signals can be minimized.

In a further advantageous configuration of the method a phase shift amount of at least one of the at least two other transmission signals can be defined as the mathematical product of a phase shift basic amount and a Golomb number of a Golomb ruler assigned to said transmission signal. In this way, the effort required to determine suitable phase shift amounts can be reduced.

A Golomb ruler is known in number theory to be a ruler in which there are no two marks at integer positions with the same distance to each other. Golomb rulers are categorized by their order and length. The order of a Golomb ruler is defined by the number of marks, and the length by the greatest distance between two marks.

The advantage of the irregular arrangement of the target signals in the Doppler dimension increases with the number of simultaneously used transmitters. With a larger number of transmitters, the structure of the Golomb ruler becomes much more complex. Up to the maximum order of available Golomb rulers, at least one suitable Golomb ruler exists for any order and thus a corresponding number of transmitters.

In the case of a high-resolution radar system (HD radar) with multiple simultaneously active transmitters, the invention minimizes the overlap of target signals for all possible constellations consisting of multiple targets. Most of the target signals remain free of interference. In this way, the interference from multiple target signals can be reliably reduced to a minimum.

With an HD radar, a plurality of transmitters, in particular more than 12 transmitters, can transmit their respective transmission signals. A plurality, in particular 128 or 256, of distance Doppler cells in the Doppler dimension can define the uniqueness range of the Doppler dimension. Without the method according to the invention, the number of possible interferences of target signals is the greater, the more transmitters are used simultaneously. For example, when using 12 simultaneously active transmitters, without the invention up to 11 of the 12 transmission signals overlap in the distance Doppler matrix. Using the method according to the invention, a maximum of one transmission signal in the distance Doppler matrix overlaps. The remaining transmission signals 11 remain free of interference.

The smallest phase shift amount can be defined to be less than the uniqueness range for the phase shift divided by the length of the Golomb ruler. The length of the Golomb ruler is the largest distance between two marks. It is advantageous to define the smallest possible step for the phase shift as $360°/Q$, where Q is a power of two. In this way, all target signals fit into a corresponding distance Doppler matrix with the same uniqueness range of the Doppler dimension.

In a further advantageous configuration of the method, the Golomb ruler can be used, the order of which is less than or equal to the number of transmission signals, including the at least one first transmission signal, to which different phase shift amounts are to be assigned. If the order of the Golomb ruler corresponds to the number of transmission signals, the number of possible interferences from multiple target signals at the receiver end can be minimized.

If the order of the Golomb ruler is less than the number of transmission signals, the Golomb ruler can also be used if the number of transmission signals is greater than the largest currently available order for Golomb rulers.

The largest currently known Golomb ruler has the order 27. It is expected that in the future, Golomb rulers with an order greater than 27 will be determined. It will thus be possible in the future to determine phase shift amounts according to the invention using Golomb rulers for an increasing number of transmitters, which can transmit an ever increasing number of transmission signals simultaneously.

In one advantageous configuration of the method, a multiplicity of target signals in a distance Doppler matrix can be determined at the receiver end from the result of the at least one two-dimensional discrete Fourier transformation.

It is advantageous to note that the number of target signals per physically present target can be at most equal to the total number of the first and other transmission signals in one cycle of the chirp sequence.

In another advantageous embodiment, at the receiver end a respective power window can be determined for each distance Doppler cell from the distance Doppler matrix, a power window matrix can be determined from the power windows and the power window matrix can be used to assign a plurality of target signals to respective transmission signals. In this way, the target signals can be validated.

For a distance Doppler cell, the corresponding power window PW can be determined from the following formula:

$$PW[r][d] = \sum_{m=0}^{GR\_Order-1} SPEC(r)[\mathrm{mod}(GR\_Marks[m]+d, D)]$$

where GR_Marks is the Golomb number of a Golomb ruler with the order GR_Order. The order GR_Order corresponds to the number of transmitters used or the number of different transmission signals. The range values r of the distance Doppler cells are in the range [0; R], where R is the number of distance Doppler cells of the distance Doppler matrix in the range dimension. The Doppler values d for the distance Doppler cells in the Doppler dimension are in the range [0; D], where D is the number of distance Doppler cells of the distance Doppler matrix in the Doppler dimension.

The following equations can be used to assign the correct complex values to the corresponding transmitters from the original two-dimensional Fourier transformation:

$$2D\text{-}FFT_{Tx1} = 2D\text{-}FFT[D_m + GR\_Marks[0]]$$

$$2D\text{-}FFT_{Tx2} = 2D\text{-}FFT[D_m + GR\_Marks[1]]$$

$$\cdots$$

$$2D\text{-}FFT_{TxN} = 2D\text{-}FFT[D_m + GR\_Marks[N-1]]$$

Here N is the number of transmitters. TX1 to TXN are the identifiers of the transmitters. $R_m$ is the index for the cell for a detected target in the power matrix in the range dimension. $D_m$ is the index for the cell for a detected target in the power matrix in the Doppler dimension.

Optionally, an additional check can be performed in the same cell $R_m$ in the range dimension if there are other adjacent detections to the cell $D_m$ in the Doppler dimension that have colliding peaks in the distance Doppler matrix. For the search, the detections can be checked in cells in the Doppler dimension in the range [mod($D_m$+GR_length, D), mod($D_m$−GR_length, D)]. If a detection is present in this range, further verification can be performed to find possible collisions in the distance Doppler matrix. These colliding cells in the Doppler dimension can be marked and this information can be used for the signal processing of the MIMO radar.

In a further advantageous configuration of the method, at least one piece of object information can be determined from at least one target signal. In this way, the object information can be used to describe the monitoring region.

At least one object information item can be advantageously determined from at least one validated target signal. Validated target signals are target signals that can be uniquely assigned to a transmission signal.

In a further advantageous refinement of the method, at least one piece of object information in the form of a speed and/or a position, in particular an interval and/or a direction of the at least one object relative to the radar system, can be determined from at least one target signal. In this way, the radar system can be used to acquire information about the at least one object, which information is of interest in particular for controlling driving functions of a vehicle.

In a further advantageous refinement of the method, a single two-dimensional discrete Fourier transformation, in particular a single two-dimensional fast Fourier transformation, is performed. In this way, information both from the at least one first transmission signal and from the least two other transmission signals can be utilized with just a single two-dimensional, in particular fast, Fourier transformation. The method can therefore be executed more efficiently.

In a further advantageous configuration of the method the at least two other transmission signals can be encoded at the transmitter end by means of binary or higher-order phase-shift keying. In this way, signal orthogonality can be brought about between the transmission signals.

The encoding of the at least two other transmission signals can advantageously take place at the frequency of the chirp sequences. In this way, the successive chirps with linear frequency ramps can optionally be emitted with the corresponding phase positions. The phases can therefore be shift-keyed in such a way that the transmission signals at the receivers are orthogonal when considered over the entire sequence length.

In a further advantageous configuration of the method, the method can be carried out multiple times in succession, in particular cyclically. In this way, the monitoring region can be monitored over a relatively long time period. Additionally or alternatively, the results of the individual measuring cycles can be compared with one another and therefore validation of the target signals can be improved and ambiguities resolved better.

At least one target signal can be advantageously validated over a plurality of measuring cycles. Such a method can be referred to as "tracking".

In addition, according to the invention, the technical objective that the at least one control and/or evaluation unit should have means for carrying out the inventive method is solved with the radar system.

The means of the control and evaluation device can advantageously be implemented by means of software and/or hardware solutions.

Moreover, the features and advantages presented in association with the method according to the invention and the radar system according to the invention and the respective advantageous configurations thereof apply in a mutually corresponding manner and vice versa. It goes without saying that the individual features and advantages can be combined among one another, wherein further advantageous effects that go beyond the sum of the individual effects can be established.

BRIEF DESCRIPTION OF THE DRAWINGS

Further advantages, features and details of the invention will become apparent from the following description, in which exemplary embodiments of the invention are explained in greater detail with reference to the drawing. A person skilled in the art will also expediently consider individually the features that have been disclosed in combination in the drawing, the description and the claims and combine them to form meaningful further combinations. Schematically, in the figures

In the figures, identical components are provided with identical reference signs.

EMBODIMENT(S) OF THE INVENTION

Figure 1:
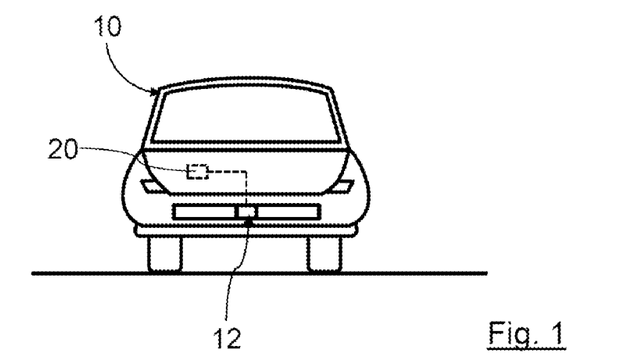
FIG. 1 shows a motor vehicle equipped with a driver assistance system and a MIMO radar system for monitoring a monitoring region in front of the motor vehicle in the direction of travel, the radar system having four transmitters and two receivers as an example.
Figure 2:
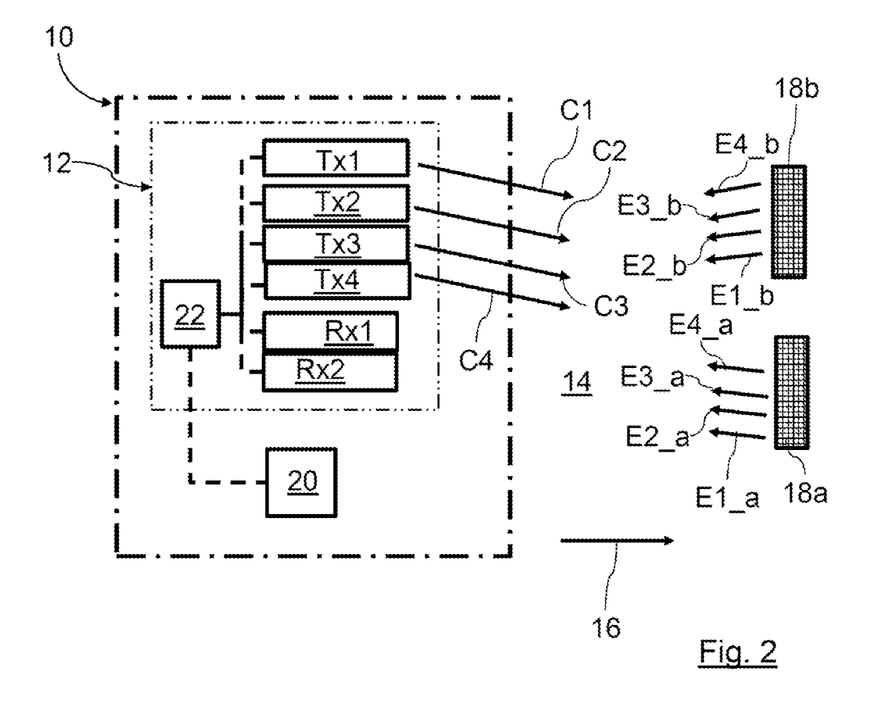
FIG. 2 shows a functional illustration of the motor vehicle with the radar system and the driver assistance system from FIG. 1.

FIG. 1 illustrates a motor vehicle 10 in the form of a passenger vehicle in front view. The motor vehicle 10 has a radar system 12. The radar system 12 is arranged, for example, in the front fender of the motor vehicle 10. The radar system 12 can be used to monitor for objects in a monitoring region 14 indicated in the function diagram of FIG. 2 in the driving direction 16 in front of the motor vehicle 10. In FIG. 2 two objects 18*a* and 18*b* are indicated.

The radar system 12 can also be arranged and oriented differently at another location on the motor vehicle 10. The objects 18*a* and 18*b* can be standing or moving objects, for example other vehicles, persons, animals, plants, obstacles, road unevennesses, for example potholes or rocks, road boundaries, traffic signs, free spaces, for example parking spaces, precipitation or the like.

The radar system 12 is configured as a frequency-modulated continuous wave radar. Frequency-modulated continuous wave radar systems are also referred to in specialist circles as FMCW (frequency modulated continuous wave) radar systems. The radar system 12 can be used, for example, to determine a respective distance, a respective direction and a respective speed of the objects 18*a* and 18*b* relative to the motor vehicle 10.

The radar system 12 is connected to a driver assistance system 20. The motor vehicle 10 can be operated autonomously or partially autonomously with the aid of the driver assistance system 20.

The radar system 12 is configured as a so-called MIMO radar system. The radar system 12 comprises, for example, a first transmitter Tx1, a second transmitter Tx2, a third transmitter Tx3, a fourth transmitter Tx4, an electronic control and evaluation device 22, a first receiver Rx1 and a second receiver Rx2. The transmitters Tx1, Tx2, Tx3 and Tx4 are implemented, for example, with a radar sensor which contains, for example, a chip with the four integrated transmitters Tx1, Tx2, Tx3 and Tx4. The transmitters Tx1, Tx2, Tx3 and Tx4 are each connected to a separate transmission antenna. For example, the—here four—transmission antennas are arranged at a distance of a few millimeters.

The control and evaluation device 22 has a signal-transmitting connection to the driver assistance system 20. The driver assistance system 20 can be used to perform open-loop/closed-loop control of the functions of the motor vehicle 10 independently of object information of the radar system 12. Is not essential for the invention whether electrical control and/or evaluation devices, such as for example the driver assistance system device 20, the control and evaluation device 22, an engine control device of the motor vehicle 10, or the like, are integrated into one or more components or assemblies or realized at least partially as decentralized components or assemblies.

Figure 3:
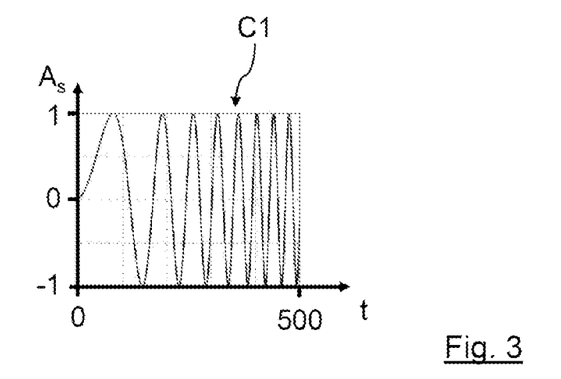
FIG. 3 shows an amplitude-time diagram of a first transmission signal in the form of a chirp, which is transmitted with a first transmitter of the radar system from FIGS. 1 and 2.

The respective transmission antennas of the transmitters Tx1, Tx2, Tx3 and Tx4 are, for example, of identical design. They have identical antenna gains and directional characteristics. The transmitters Tx1, Tx2, Tx3 and Tx4 can be used to transmit respective transmission signals C1, C2, C3 and C4, in each case at a constantly changing frequency as chirp sequences Cseq into the monitoring region 14. As examples, a transmission signal C1, which is transmitted with the first transmitter Tx1, is shown in FIG. 3 and the corresponding chirp sequence Cseq in FIG. 4. The transmission signals C1, C2, C3 and C4 are reflected at the object 18a and sent back to the receivers Rx1 and Rx2 as corresponding received signals E1_a, E2_a, E3_a and E4_a. In addition, the transmission signals C1, C2, C3 and C4 are reflected at the object 18b and sent back to the receivers Rx1 and Rx2 as corresponding received signals E1_b, E2_b, E3_b and E4_b. With the receivers Rx1 and Rx2, the received signals E1_a, E2_a, E3_a, E4_a, E1_b, E2_b, E3_b, and E4_b are converted to a form that can be used with the control/evaluation device 22. According to a further method described below, the range, the direction and the speed of the objects 18a and 18b relative to the motor vehicle 10 are determined from the received signals E1_a, E2_a, E3_a, E4_a, E1_b, E2_b, E3_b and E4_b using the control and evaluation device 22.

The method for determining pieces of object information, namely the ranges, the directions and speeds, of objects 18a and 18b which are sensed by means of the radar system 12 is explained by way of example below with reference to FIGS. 3 to 7.

In the method, the transmitters Tx1, Tx2, Tx3 and Tx4 are controlled with the control and evaluation device 22 in such a way that with the first transmitter Tx1 a chirp sequence Cseq of first transmission signals C1, with the second transmitter Tx2 a chirp sequence Cseq of second transmission signals C2, with the third transmitter Tx3 a chirp sequence Cseq of third transmitter signals C3 and with the fourth transmitter Tx4 a chirp sequence Cseq of fourth transmitter signals C4 are transmitted into the monitoring region 14. The respective chirps of the transmission signals C1, C2, C3 and C4 are transmitted simultaneously at the same clock rate.

The transmission signals C1, C2, C3 and C4 are generated from the same frequency modulated continuous wave signal, for example. The second transmission signal C2, the third transmission signal C3 and the fourth transmission signal C4 are encoded by phase modulation with respect to the first transmitting signal C1 in such a way that signal orthogonality is achieved between the first transmission signal C1, the second transmission signal C2, the third transmission signal C3, and the fourth transmission signal C4.

FIG. 3 shows an example of the first transmission signal C1 in an amplitude-time diagram. The amplitude $A_s$ is plotted on the ordinate axis and the time t on the abscissa axis. The amplitude $A_s$ of the first transmission signal C1 is normalized to 1 as an example.

Figure 4:
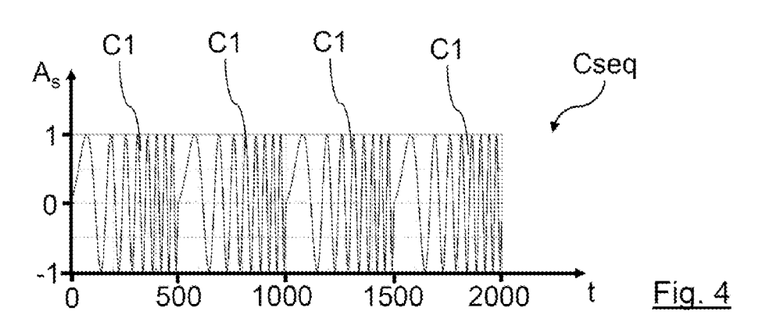
FIG. 4 shows an amplitude-time diagram of a chirp sequence consisting of chirps of the first transmission signal, which is transmitted with the first transmitter of the radar system from FIGS. 1 and 3.

The amplitude-time diagram from FIG. 4 shows a chirp sequence Cseq of first transmission signals C1. A total of 128 such first transmission signals C1 can be transmitted as a chirp sequence Cseq during a measurement, for example. The number of transmission signals C1 in a chirp sequence Cseq specifies a uniqueness range, which is 128 in this example. The successive first transmission signals C1 of a chirp sequence Cseq each have the same phase position, that is to say are each shifted by A phase shift amount P_Tx1 of 0° in respect of their phase. In total, the first transmission signals C1 are thus transmitted in cycles with a constant or identical phase or phase position.

Figure 5:
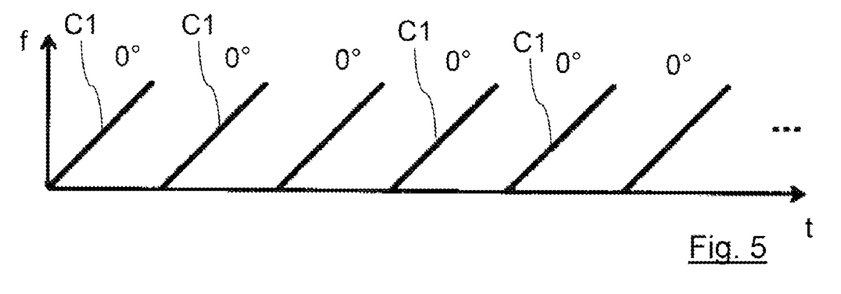
FIG. 5 shows a frequency-time diagram of the chirp sequence from FIG. 4.

FIG. 5 shows a frequency-time diagram for the chirp sequence Cseq of the first transmission signal C1 from FIG. 4. The frequency f is plotted on the ordinate axis and the time t on the abscissa axis. The successive first transmission signals C1 are shown here each as frequency ramps, which are shifted by 0° with respect to their phase.

The phase positions of the second transmission signals C2 are each incremented by a constant phase shift amount P_Tx2 from one chirp to the next in the corresponding chirp sequence Cseq. The phase positions of the third transmission signals C3 are each incremented by a constant phase shift amount P_Tx3 from one chirp to the next in the corresponding chirp sequence Cseq. The phase positions of the fourth transmission signals C4 are each incremented by a constant phase shift amount P_Tx4 from one chirp to the next in the corresponding chirp sequence Cseq. The phase positions of the first transmission signals C1 are constant from one chirp to the next in the corresponding chirp sequence Cseq, so that a corresponding phase shift amount P_Tx1=0.

The phase shift amounts P_Tx2, P_Tx3 and P_Tx4 are different and specified in such a way that of all transmission signals C1, C2, C3 and C4 the absolute differences Diff_P between the respective phase shift amounts P_Tx1, P_Tx2, P_Tx3 and P_Tx4 of any two of the transmission signals C1, C2, C3 and C4 are different. The respective absolute differences Diff_P between P_Tx1 and P_Tx2, between P_Tx1 and P_Tx3, between P_Tx1 and P_Tx4, between P_Tx2 and P_Tx3, between P_Tx2 and P_Tx4 and between P_Tx3 and P_Tx4 are therefore different.

The phase shift amounts P_Tx1, P_Tx2, P_Tx3 and P_Tx4 are specified as the mathematical product of a phase shift basic value P0 of a respective Golomb number GR_Marks of a Golomb ruler with the order GR_Order. A Golomb ruler is used, the order GR_Order of which corresponds to the total number N of transmitters Tx1, Tx2, Tx3 and Tx4. In this exemplary embodiment, four transmitters transmit simultaneously so that the Golomb ruler with order GR_Order=4 is used. The Golomb numbers GR_Marks of the Golomb rulers used are 0, 1, 4, and 6.

For the specification of the phase shift basic value P0, for example, the smallest possible step for a phase shift can be specified by 360°/Q, where Q is a power of two. As an example, Q can be 16 and the phase shift basic value P0=22.5° can be specified. The phase shift basic value P0 can also be specified in other ways. For example, the phase shift basic amount P0 can be selected such that the smallest phase shift amount is smaller than the uniqueness range for the phase shift divided by the length of the Golomb ruler used. The length of the Golomb ruler is the largest distance between two marks.

In general, the following applies to the calculation of the phase shift amounts P_Tx from the product of the respective Golomb numbers with the phase shift basic amount P0:

$P\_Txn = GR\_Marks\_n * P0$ where n is the serial parameter for the corresponding transmitter Tx. For n, n=[1; N], where N is the total number of simultaneously sending transmitters Tx.

In the specific exemplary embodiment, the total number of transmitters N=4. The phase shift basic amount is specified as P0=22.5°.

Therefore, the phase shift amounts P_Tx of the four transmitters Tx1, Tx2, Tx3 and Tx4 are obtained as follows:

$P\_Tx1 = 0*22.5° = 0°$ $P\_Tx2 = 1*22.5° = 22.5°$ $P\_Tx3 = 4*22.5° = 90°$ $P\_Tx4 = 6*22.5° = 135°$

For all differences Diff_P between the phase shift amounts P_Tx of any two of the transmitters Tx1, Tx2, Tx3 and Tx4, different values result as follows:

$Diff\_P(2,1) = P\_Tx2 - P\_Tx1 = 22.5°$ $Diff\_P(3,1) = P\_Tx3 - P\_Tx1 = 90°$ $Diff\_P(4,1) = P\_Tx4 - P\_Tx1 = 135°$ $Diff\_P(3,2) = P\_Tx3 - P\_Tx2 = 67.5°$ $Diff\_P(4,2) = P\_Tx4 - P\_Tx2 = 112.5°$ $Diff\_P(4,3) = P\_Tx4 - P\_Tx3 = 45°$ For the respective chirp sequences Cseq, which are transmitted with the four transmitters Tx1, Tx2, Tx3 and Tx4, the following phase constellation therefore results, where "Tkt" designates the respective cycle of the chirp sequences Cseq and for the sake of clarity only 10 of the cycles are shown as an example:

|     | Tkt1 | Tkt2   | Tkt3 | Tkt4  | Tkt5 | Tkt6   | Tkt7 | Tkt8   | Tkt9 | Tkt10  | ... |
|-----|------|--------|------|-------|------|--------|------|--------|------|--------|-----|
| Tx1 | 0°   | 0°     | 0°   | 0°    | 0°   | 0°     | 0°   | 0°     | 0°   | 0°     |     |
| Tx2 | 0°   | 22.5°  | 45°  | 67.5° | 90°  | 112.5° | 135° | 157.5° | 180° | 202.5° |     |
| Tx3 | 0°   | 90°    | 180° | 270°  | 0°   | 90°    | 180° | 270°   | 0°   | 90°    |     |
| Tx4 | 0°   | 135°   | 270° | 45°   | 180° | 315°   | 90°  | 225°   | 0°   | 135°   |     |

The phases of the transmission signals C1, C2, C3 and C4 are incremented with each clock cycle by their respective phase shift amount P_Tx1, P_Tx2, P_Tx3 or P_Tx4. In the first clock cycle Tkt1, the transmission signals C1, C2, C3 and C4 each start with a phase of 0°. For example, for the transmission signal C2 of the second transmitter Tx2, the phase in the subsequent cycles increases from cycle to cycle, i.e. from chirp to chirp, by the phase shift amount P_Tx2, i.e. by 22.5°.

With the receivers Rx1 and Rx2, the echoes of the transmission signals C1, C2, C3 and C4 reflected at the object 18a are received as received signals E1_a, E2_a, E3_a and E4_a and the echoes of the transmission signals C1, C2, C3 and C4 reflected at the object 18b as received signals E1_b, E2_b, E3_b and E4_b and converted into a form that can be used with the control and evaluation device 22.

The received signals E1_a, E2_a, E3_a, E4_a, E1_b, E2_b, E3_b and E4_b are subjected to a single two-dimensional fast Fourier transformation with corresponding means of the control/evaluation device 22.

From the result of the two-dimensional discrete Fourier transformation, four target signals corresponding to the transmission signals C1, C2, C3 and C4 are determined for each detected object 18a and 18b, namely the target signals ZS1_a, ZS2_a, ZS3_a, ZS4_a for the object 18a and the target signals ZS1_b, ZS2_b, ZS3_b, ZS3_b, ZS4_b for the object 18b. The number of target signals for an object corresponds to the total number of transmitters Tx1, Tx2, Tx3 and Tx4, in this case four. In this phase of the method, the exemplary eight target signals are not yet assigned to the respective transmitters Tx1, Tx2, Tx3 and Tx4, but are nevertheless already assigned here the respective reference signs ZS1_a, ZS2_a, ZS3_a, ZS4_a, ZS1_b, ZS2_b, ZS3_b, ZS4_b. The assignment of the target signals ZS1_a, ZS2_a, ZS3_a, ZS4_a, ZS1_b, ZS2_b, ZS3_b, ZS4_b, i.e. their validation, is only carried out in a later phase of the method.

Figure 6:
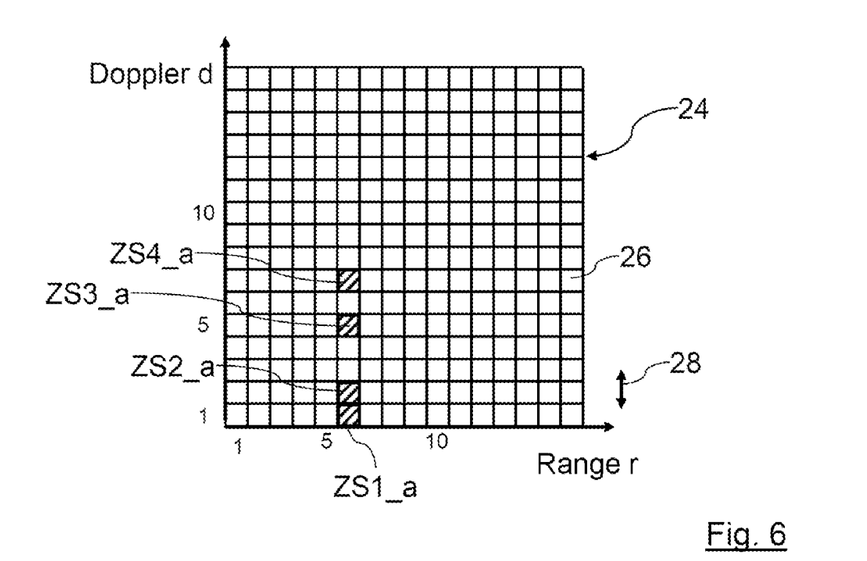
FIG. 6 shows a distance Doppler matrix with target signals, which are determined from received signals of respective chirp sequences which are transmitted with the four transmitters of the radar system from FIGS. 1 and 2 and reflected at a target, wherein the detected target does not have a relative speed with respect to the radar system.
Figure 7:
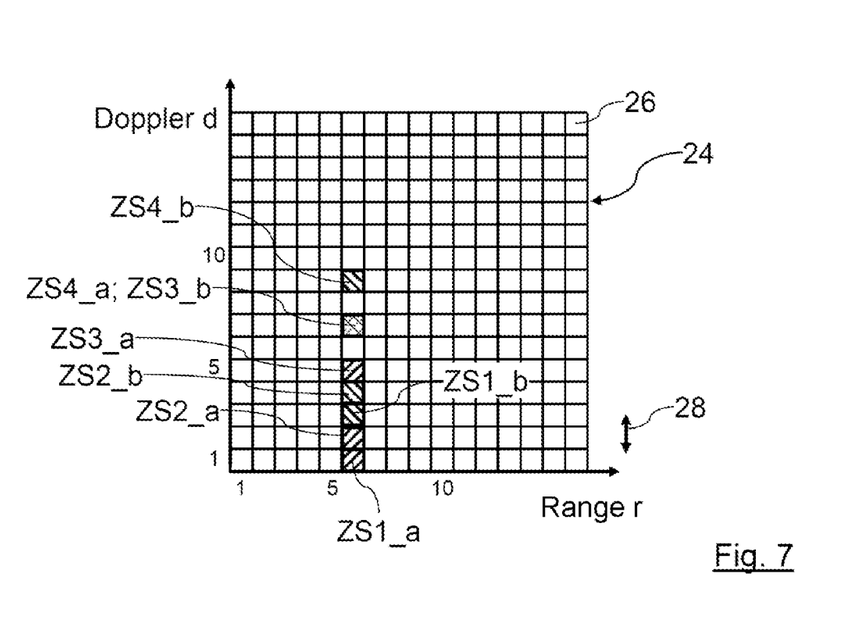
FIG. 7 shows the distance Doppler matrix from FIG. 6, here additionally showing target signals from a second target which has a relative speed with respect to the radar system.

In FIG. 6, for better clarity the target signals ZS1_a, ZS2_a, ZS3_a, ZS4_a are only indicated for the object 18a in a distance Doppler matrix 24, in each case by hatching lines towards the top right. In FIG. 7, the target signals ZS1_b, ZS2_b, ZS3_b, ZS4_b for object 18b are also indicated with hatching lines towards the bottom right. As will be explained below, the target signal ZS4_a for the object 18a and the target signal ZS3_b for the object 18b fall into the same distance Doppler cell 26 of the distance Doppler matrix 24, which is therefore shown cross-hatched. In the exemplary embodiment described, by way of example the object 18a does not perform a relative motion with respect to the radar system 12. The object 18b does perform a relative motion with respect to the radar system 12. In addition, in the exemplary embodiment described, object targets of the objects 18a and 18b, at which the transmission signals C1, C2, C3 and C4 are reflected, are located at the same distance from the radar system 12. For the purposes of the invention, object targets are regions of objects in the monitoring region at which transmission signals are reflected in such a way that the corresponding echoes can be detected by the radar system 12 as received signals.

The distance Doppler matrix 24 shown in FIGS. 6 and 7 can also be referred to as a range Doppler matrix. The range Doppler matrix 24 consists of a plurality of range Doppler cells 26. Each range Doppler cell 26 is characterized by a range value r, also known as a range bin, and a Doppler value d, also known as a Doppler bin. In FIGS. 6 and 7 the range values r are shown on the abscissa axis and the Doppler values d on the ordinate axis by way of example.

In the present exemplary embodiment, the uniqueness range in the Doppler dimension corresponds to the number of transmission signals of a chirp sequence Cseq and corresponds to 128 range Doppler cells 26 in the range Doppler matrix 24, as already mentioned above. In FIGS. 6 and 7, for the sake of clarity, only some of the range Doppler cells 26 are indicated by way of example in the form of a grid.

Since the object targets of the objects 18a and 18b are located at the same distance from the radar system 12, all target signals ZS1_a, ZS2_a, ZS3_a, ZS4_a, ZS1_b, ZS2_b, ZS3_b, ZS4_b have the same range value r, for example r=6.

As a consequence of the phase constellation according to the invention described above for the transmission signals C1, C2, C3 and C4, the distances 28 in the Doppler dimension, i.e. the difference between the respective Doppler values d, between adjacent target signals ZS1_a to ZS2_a, ZS2_a to ZS3_a and ZS3_a to ZS4_a respectively, which originate from the object 18a as shown in FIGS. 6 and 7, are different.

The target signal ZS1_a has the range Doppler coordinates (6, 1), for example. The target signal ZS2_a has the range Doppler coordinates (6, 2), for example. The target signal ZS3_a has the range Doppler coordinates (6, 5), for example. The target signal ZS4_a has the range Doppler coordinates (6, 7), for example. The distance 28 in the Doppler dimension between the target signals ZS1_a and ZS2_a is therefore equal to 1. The distance 28 between target signals ZS2_a and ZS3_a is therefore 3. The distance 28 between target signals ZS3_a and ZS4_a is therefore 2.

Also as a consequence of the phase constellation described above for the transmission signals C1, C2, C3 and C4, the distances 28 in the Doppler dimension, i.e. the differences between the respective Doppler values d, between the adjacent target signals ZS1_b and ZS2_b and adjacent target signals ZS3_b and ZS4_b respectively, which originate from the object 18b as shown in FIG. 7, are different. The target signal ZS1_b has the range Doppler coordinates (6, 3), for example. The target signal ZS2_b has the range Doppler coordinates (6, 4), for example. The target signal ZS3_b has the range Doppler coordinates (6, 7), for example. The target signal ZS4_b has the range Doppler coordinates (6, 9), for example. Therefore, the distance 28 in the Doppler dimension between the target signals ZS1_b and ZS2_b is equal to 1. The distance 28 between the target signals ZS3_b and ZS4_b is 2. The distance 28 between the target signals ZS2_b and ZS3_b is 3.

The phase constellation for the transmission signals C1, C2, C3 and C4 according to the invention ensures that the target signals ZS1_a, ZS2_a and ZS4_a, which originate from the object 18a, and the target signals ZS1_b, ZS2_b and ZS4_b, which originate from the object 18b, are each located in different range Doppler cells 26 and can therefore be distinguished from each other. Only the target signal ZS4_a from object 18a and the target signal ZS3_b from object 18b in the exemplary embodiment are in the same range Doppler cell 26 with the range Doppler coordinates (6, 5).

To validate the target signals ZS1_a, ZS2_a, ZS3_a, ZS4_a, ZS1_b, ZS2_b, ZS3_b, ZS4_b they must be assigned to the respective transmission signals C1, C2, C3 and C4, i.e. the respective transmitters Tx1, Tx2, Tx3 and Tx4.

To assign the target signals ZS1_a, ZS2_a, ZS3_a, ZS4_a, ZS1_b, ZS2_b, ZS3_b, ZS4_b to the respective transmission signals C1, C2, C3 and C4, a respective power window PW is determined for each range Doppler cell 26 from the range Doppler matrix 24. A power window matrix, not shown in the figures, is determined from the power windows PW. The power window matrix is used to determine the power window target signals which correspond to the target signals ZS1_a, ZS2_a, ZS3_a, ZS4_a, ZS1_b, ZS2_b, ZS3_b, ZS4_b from the range Doppler matrix 24.

The power windows PW are calculated for each range Doppler cell 26 using the following formula:

$$PW[r][d] = \sum_{m=0}^{GR\_Order-1} SPEC(r)[\mod(GR\_Marks[m] + d, D]$$

where GR_Marks is the Golomb number of the Golomb ruler used with the order GR_Order, thus in the following exemplary embodiment, 4. The parameter for the range values of the range Doppler cells 26 is the range value r from the range [0; R], where R is the number of range Doppler cells 26 of the range Doppler matrix 24 in the range dimension. D is the number of range Doppler cells 26 of the range Doppler matrix 24 in the Doppler dimension. The parameter for the range Doppler cells 26 in the Doppler dimension is the Doppler value d from the range [0; D].

The following equations are used to assign the correct complex values from the original two-dimensional Fourier transform, namely the range Doppler matrix 24, to the corresponding transmitters Tx1, Tx2, Tx3, and Tx4:

$$2D\text{-}FFT_{Tx1} = 2D\text{-}FFT[D_m + GR\_Marks[0]]$$

$$2D\text{-}FFT_{Tx2} = 2D\text{-}FFT[D_m + GR\_Marks[1]]$$

...

$$2D\text{-}FFT_{TxN} = 2D\text{-}FFT[D_m + GR\_Marks[N-1]]$$

where N is the number of transmitters, thus in the exemplary embodiment shown, 4. TX1 to TXN, namely Tx1 to Tx4, are the identifiers of the transmitters. $R_m$ is the index for the range values of the range Doppler cells for a detected target in the performance matrix. $D_m$ is the index for the Doppler values of the range Doppler cells for a detected target in the performance matrix.

Optionally, an additional verification can be performed in a range cell $R_m$ if there are other adjacent detections to the Doppler cell Dm that have colliding peaks in the range Doppler matrix 24. For the search, the detections in Doppler cells in the range [mod($D_m$+GR_length, D), mod($D_m$−GR_length, D)] can be checked. If a detection is present in this range, a further verification can be performed to find possible collisions in the distance Doppler matrix 24. These colliding Doppler cells can be marked and this information can be used for the MIMO signal processing.

Since the target signals ZS1_a, ZS2_a, ZS3_a, ZS4_a, ZS1_b, ZS2_b, ZS3_b, ZS4_b have the same range value in the range Doppler matrix 24, the correct range can be derived from them in each case.

Since the first transmission signal C1 is not encoded and is shifted in its phase, the Doppler value d which is associated with the first target signal ZS1_a can be considered to be the correct Doppler value, and the correct relative speed of the object 18a can be derived therefrom. Accordingly, the correct relative speed of the object 18b can be derived from the Doppler value d of the first target signal ZS1_b.

After a suitable correction with regard to the phase constellation of the transmission signals C1, C2, C3 and C4, the correct relative speed can also be derived from the other unique and validated target signals ZS2_a, ZS3_a and ZS2_b, ZS4_b. The target signals ZS4_a and ZS3_b fall into the same range Doppler cell 26 and therefore cannot be uniquely assigned to the transmission signals C1, C2, C3 and C4 and the objects 18a and 18b and validated.

The phase values associated with the unique and validated target signals ZS1_a, ZS2_a, ZS3_a, ZS1_b, ZS2_b, ZS4_b and the phase values associated with the transmission signals C1, C2, C3 and C4 can be determined independently of each other due to the shift and can be used for a phase-based angular measurement of the azimuth and the elevation of the objects 18a and 18b with respect to the radar system 12.

From the validated target signals ZS1_*a*, ZS2_*a*, ZS3_*a*, ZS1_*b*, ZS2_*b*, ZS4_*b* the respective relative speed, the respective distance and respective direction and thus the position of objects 18*a* and 18*b* with respect to the radar system 12 is thus determined as object information.

The method is carried out cyclically, with the result that the monitoring region 14 is monitored continuously for objects 18*a* and 18*b*, and correspondingly detected objects 18*a* and 18*b* can be tracked.

The invention can also be used for radar systems 12 with more or fewer than four transmitters Tx1, Tx2, Tx3 and Tx4, for example 12 or more transmitters, and/or more or fewer than two receivers Rx1 and Rx2 and corresponding transmission signals C1, C2, C3 and C4 or received signals E1, E2, E3 and E4.

The invention claimed is:

1. A method for determining at least one piece of object information about at least one object sensed with a radar system, the method comprising:
   transmission signals in the form of chirps are each transmitted in chirp sequences into a monitoring region of the radar system with at least four transmitters;
   echoes, which are reflected at the at least one object, of the transmission signals are received as received signals with at least one receiver, and are converted into a form which can be used by an electronic control and/or evaluation device;
   the received signals are subjected to at least one two-dimensional discrete Fourier transformation;
   from the result of the at least one two-dimensional discrete Fourier transformation, at least one target signal is determined; and
   from the at least one target signal at least one piece of object information is determined,
   wherein at the transmitter end at least one first transmission signal and at least three other transmission signals are generated from a frequency-modulated continuous wave signal and each is transmitted simultaneously into the monitoring region of the radar system with a separate transmitter,
   wherein the at least three other transmission signals are each encoded by means of a phase modulation with respect to the at least one first transmission signal,
   wherein the respective phase positions of the at least three other transmission signals are each incremented or decremented by a constant phase shift amount from one chirp to the next,
   wherein different phase shift amounts are used for the at least three other transmission signals,
   wherein the respective phase shift amounts for the at least three other transmission signals are specified in such a way that for at least four of the transmission signals, including the at least one transmission signal, the absolute differences between the phase shift amounts of any two of the at least four transmission signals are different, and
   wherein at a receiver end:
      from the result of the at least one two-dimensional discrete Fourier transformation, a plurality of target signals is determined in a range Doppler matrix; and
      a respective power window is calculated for each range Doppler cell from the range Doppler matrix as a function of a Golomb number of a Golomb ruler, a power window matrix is determined from the power windows and the power window matrix is used to assign a plurality of target signals to respective transmission signals.

2. The method as claimed in claim 1, wherein the phase position of the at least one first transmission signal is held constant from one chirp to the next and a corresponding phase shift amount equal to zero is used.

3. The method as claimed in claim 1, wherein the at least two other transmission signals are encoded in such a way that of all transmission signals including the at least one first transmission signal, the absolute differences between the phase shift amounts of any two of the at least four transmission signals are different.

4. The method as claimed in claim 1, wherein the phase shift amounts of the transmission signals are specified in such a way that there are no two phase shift amounts among the phase shift amounts for which the absolute difference equals the absolute difference of at least one of the two phase shift amounts for a phase shift amount of another transmission signal.

5. The method as claimed in claim 1, wherein a phase shift amount of at least one of the at least three other transmission signals is defined as the mathematical product of a phase shift basic amount and a Golomb number of the Golomb ruler assigned to the at least one of the at least two other transmission signals.

6. The method as claimed in claim 5, wherein the Golomb ruler is used, the order of which is less than or equal to the number of transmission signals, including the at least one first transmission signal, to which different phase shift amounts are to be assigned.

7. The method as claimed in claim 1 from at least one target signal at least one piece of object information is determined.

8. The method as claimed in claim 1, wherein from at least one target signal at least one piece of object information is determined in the form of a distance and/or a direction, of the at least one object relative to the radar system.

9. The method as claimed in claim 1, wherein a single two-dimensional fast Fourier transformation is performed.

10. The method as claimed in claim 1, wherein the at least two other transmission signals are encoded at the transmitter end by means of binary or higher-order phase-shift keying.

11. The method as claimed in claim 1, wherein the method is carried out multiple times in succession cyclically.

12. A radar system for determining at least one piece of object information about at least one object, comprising:
   at least four transmitters for transmitting transmission signals in the form of chirps in chirp sequences into a monitoring region; at least one receiver for receiving echoes, which are reflected at the at least one object, of the transmission signals as received signals; and
   at least one control and/or evaluation device for controlling the at least one transmitter and the at least one receiver and for evaluating the received signals,
   wherein the at least one control and/or evaluation device has means for carrying out the method according to claim 1.

* * * * *